June 17, 1924.
E. COBURN
1,498,354
COMBINATION HARVESTER THRASHER
Filed Feb. 9, 1922
5 Sheets-Sheet 4
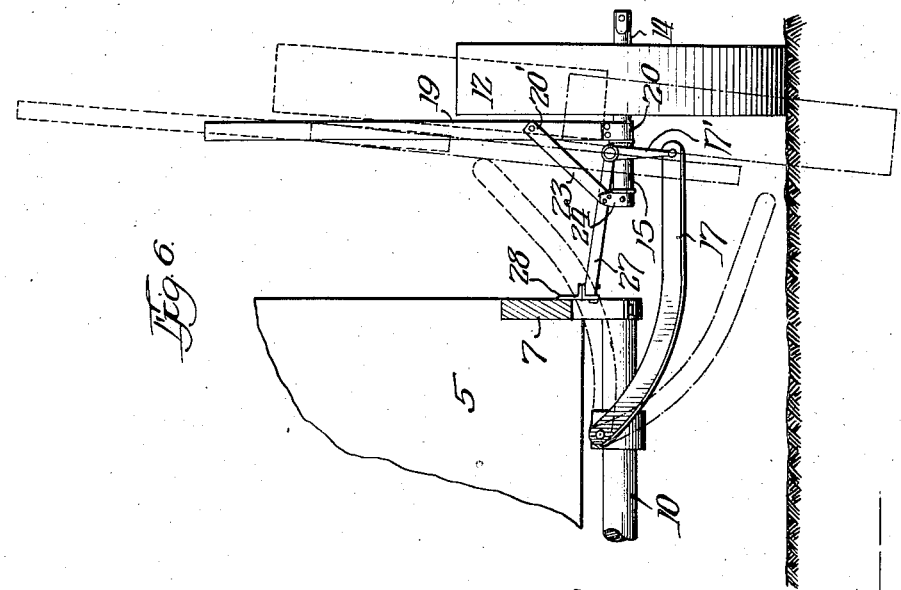
Inventor:
Ernest Coburn
By James A. Walsh,
Atty.

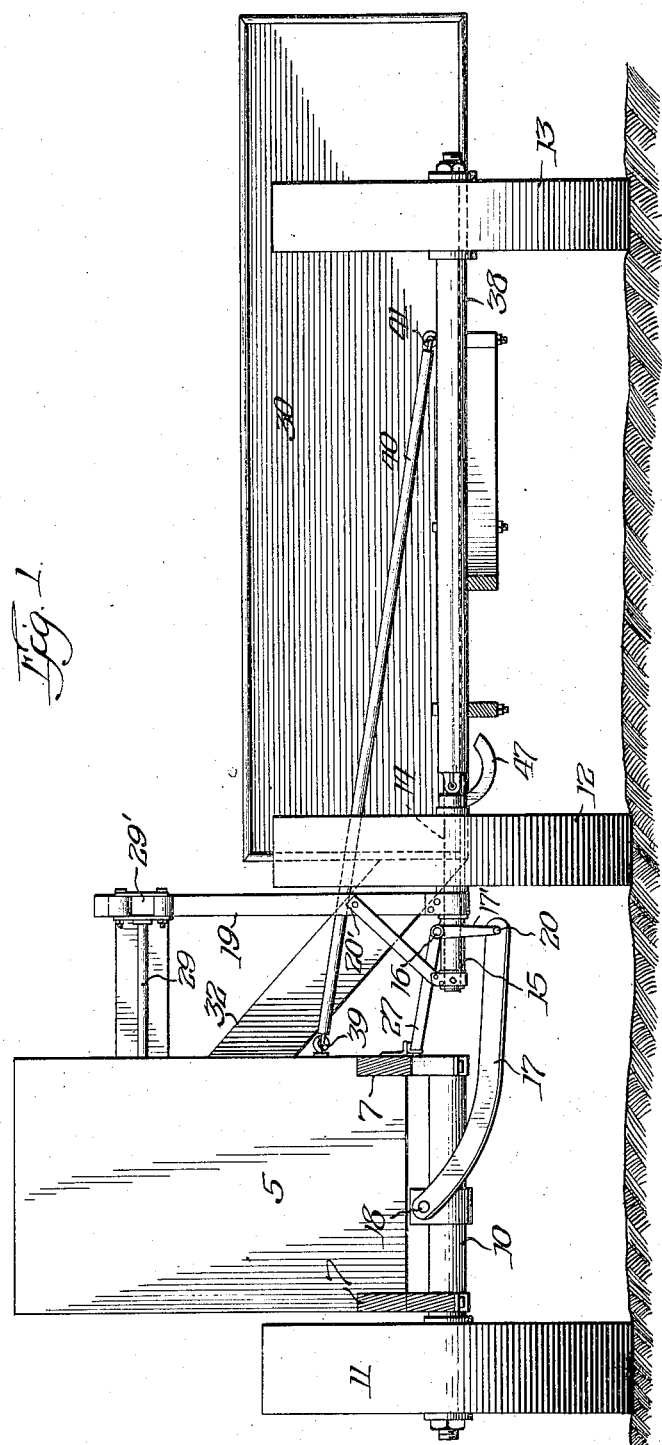

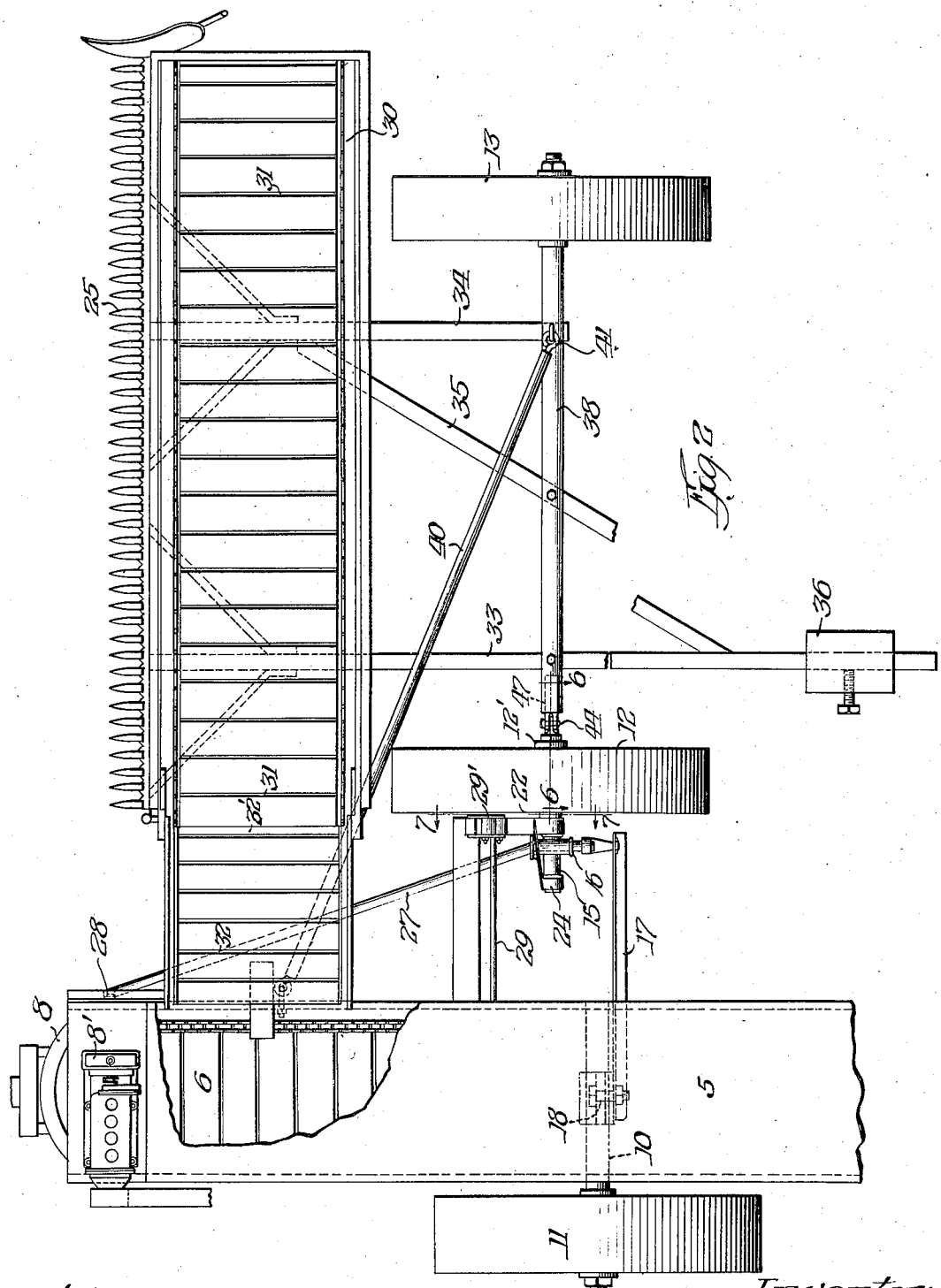

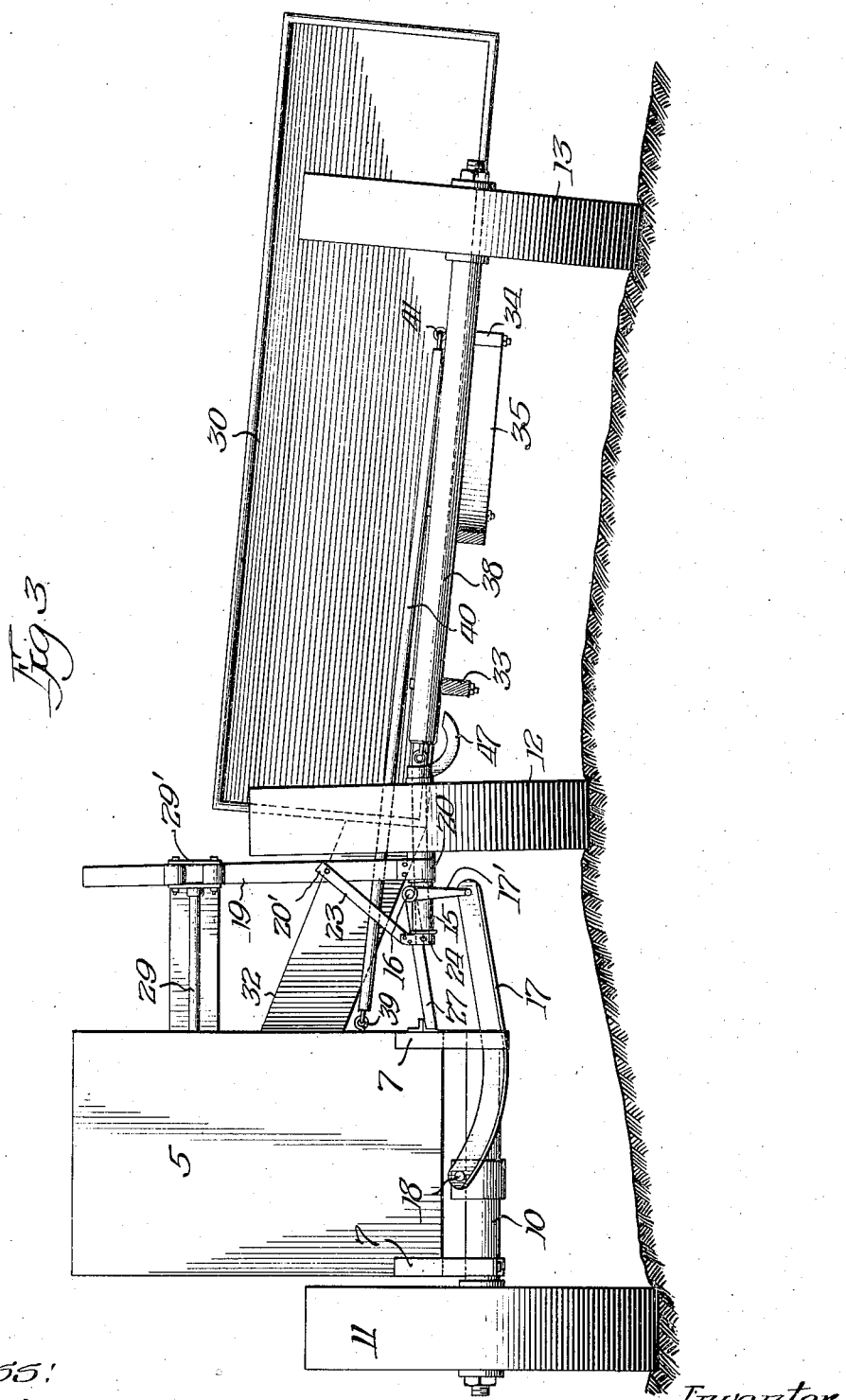

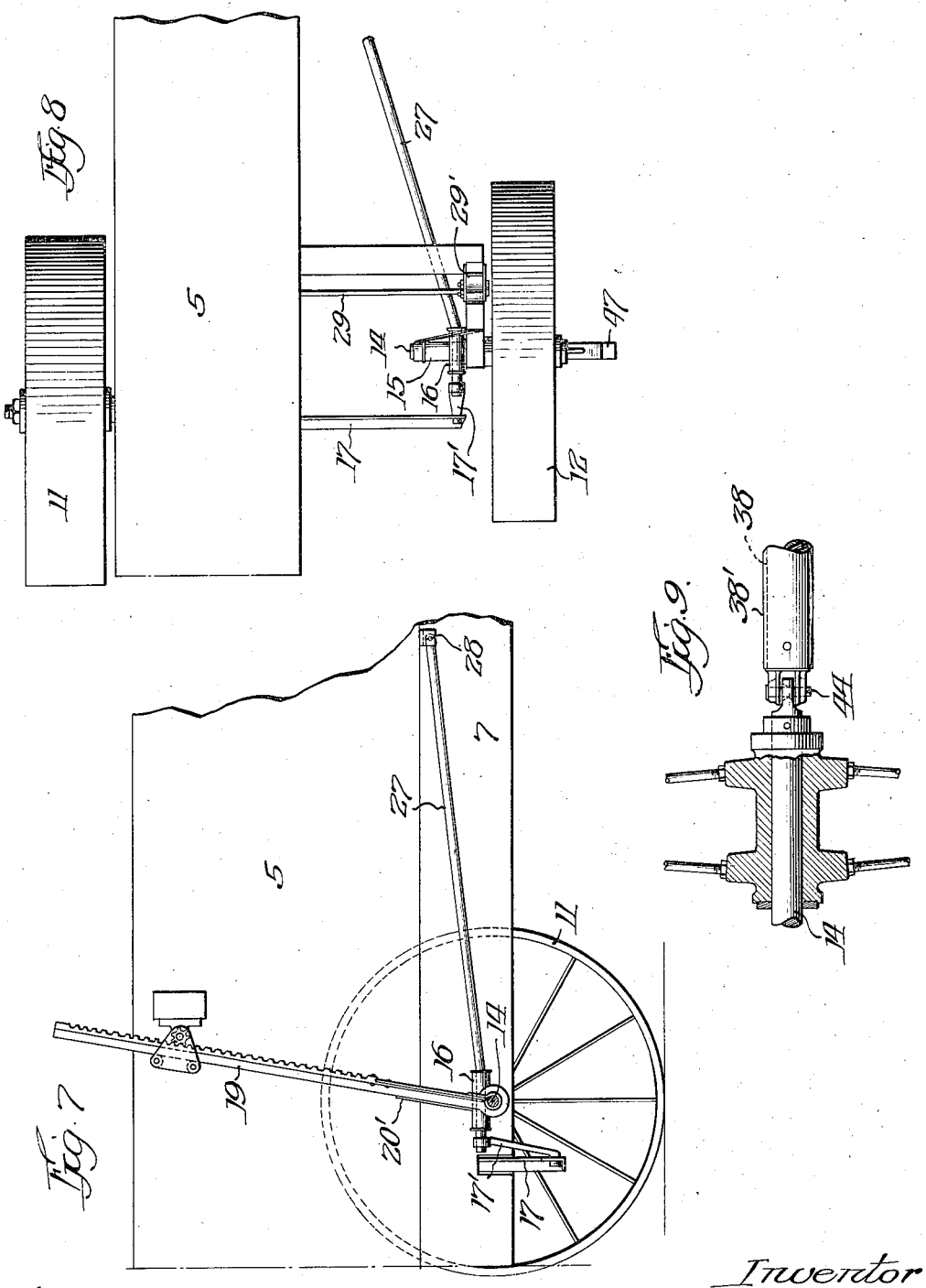

Patented June 17, 1924.

1,498,354

UNITED STATES PATENT OFFICE.

ERNEST COBURN, OF RACINE, WISCONSIN, ASSIGNOR TO J. I. CASE THRESHING MACHINE COMPANY, OF RACINE, WISCONSIN, A CORPORATION.

COMBINATION HARVESTER-THRASHER.

Application filed February 9, 1922. Serial No. 535,150.

*To all whom it may concern:*

Be it known that I, ERNEST COBURN, a citizen of the United States, residing at Racine, in the county of Racine and State of Wisconsin, have invented certain new and useful Improvements in Combination Harvester-Thrashers, of which the following is a specification.

My present invention relates to improvements in combination harvester-thrashers for general use and especially equipped with devices rendering it automatically adjustable and adaptable for side-hill harvesting, and by which standing grain is cut, conveyed to the separator or threshing portion of the machine, and there threshed and separated; and the primary object of the invention is to improve in certain particulars the flexible connections between the harvester section and the threshing section of the machine for adapting the harvester to side-hill operations. The harvester-thrasher forming the subject-matter of the invention is of that type supported upon three wheels comprising a bull-wheel, a grain-wheel, and an intermediate adjustable or leveling-wheel embodied in the flexible connection between the longitudinally hinged and tiltable harvester frame and the main frame which supports the thrasher element of the combined machinery. As will be understood, a fourth wheel for steering the machine may also be used, preferably at the front of the thrasher frame. By the utilization of the hinged frame sections, and the flexible connections between the intermediate and adjustable supporting wheel and the laterally disposed bull-wheel and grain-wheel, a flexibility is imparted to the machine whereby the harvester or header portion when elevated may move slightly to the rear with relation to the thrasher section, and when lowered may move slightly to the front with relation to the thrasher, the adaptability of the harvester to a plurality of movements thus compensating for the difference in position between it and the thrasher frame. This adjustment of the two frames insures at all times the correct operative position between the harvester and thrasher in order that the cut grain may be conveyed to the thrasher housing and deposited on the draper therein, and the harvester may be maintained in proper position for efficient feed of the grain to the separating and threshing mechanism.

In the accompanying drawings, forming part hereof, Figure 1 is a rear elevation of a combined harvester-thrasher embodying my invention, non-essential parts being omitted for a clear understanding thereof; Fig. 2, a plan of the combined harvester-thrasher; Figs. 3, 4 and 5, rear elevations showing the relation between the thrasher and harvester as such elements encounter ground irregularities; Fig. 6, a detail of the leveling-wheel controlling mechanism; Fig. 7, a fragmentary view partially in section looking in the direction indicated by the arrows 7, 7, in Fig. 2; Fig. 8, a fragmentary plan of the parts shown in Fig. 7; and Fig. 9, is a detail of the flexible shaft which I employ for connecting the grain and leveling-wheels.

In the preferred form of the invention as shown in the drawings, the threshing and separating mechanism is included within the housing, 5, a portion of the draper or endless conveyer, 6, or other selected mechanisms common to thrashers, being indicated where the housing is broken away in Fig. 2. The thrasher is supported on beams, 7, extending longitudinally of the machine and forming the main-frame, at the front of which thrasher a swiveled one-wheel truck is indicated, at 8, for supporting the front of the machine and steering the harvester; and it will be understood that reference to the machine generally comprehends a harvester and thrasher so combined as to cut and gather the standing grain and deliver the same to the thrasher to be threshed and separated. The main axle, 10, is secured to the thrasher and the bull-wheel, 11, and is journaled upon the latter with any suitable connections (not shown) for actuating operating parts of the combination harvester-thrasher, which machine may be pulled by suitable power applied to the steering-truck 8, while a motor, indicated at 8', may be employed for operating the thrasher and mechanisms associated therewith by any suitable system of gearing for such purposes.

In addition to the bull-wheel 11 a leveling-wheel, 12, and the grain-wheel, 13, support the traveling machine, the intermediate leveling-wheel 12 being supported by a straxle, 14. The sleeve, 15, is mounted on said stub-axle 14 and has formed or connected therewith a socket member, 16, for a purpose which will hereinafter appear, and to said main axle 10 I flexibly connect a link, 17, by a pivot bolt, 18. Said link 17 at its opposite end is pivotally connected to an arm, 17', which at its opposite end is connected to a guiding-bar (27) pivotally secured in socket-member 16. A rack-bar, 19, is clamped, as at 20, or otherwise secured to stub-axle 14, and is also further secured to a brace, 23, as at 20', which brace is connected to said stub-axle at 24. Therefore, all of said elements, including wheel 12, being thus connected by the link 17, and arm 17', rack-bar 19 and brace 23, and as otherwise described, are in effect a unit and move together. The stub-axle 14 is also flexibly connected to the main frame or one of the beams 7 by a diagonally disposed guiding-bar, 27, pivoted at 28, to the thrasher frame and which, at its opposite end, is secured in socket-member 16 so that it will follow movements of the unitary structure described. The rack-bar 19 being securely fixed to the stub-axle 14 as stated, these elements constitute in effect a right angle elbow connected to wheel 12, while the guiding-bar 27 assists in maintaining said wheel 12 in substantially parallel relation to the thrasher. In this manner I not only provide a suitable connection between wheel 12 and the thrasher, but should there occur undue end thrust or shock from the harvester-supporting axle by reason of the grain-wheel 13 skidding into a depression or rut, or otherwise, such shock becomes absorbed by link 17 and in turn is taken up by rack-bar 19 and parts associated therewith.

When the machine is traveling over a sidehill the wheel 12 may be caused to be elevated or lowered, or laterally tilted somewhat, because of its flexible connection through link 17 with thrasher 5 as described, and with axle, 38, to permit the harvester section, 30, to follow the ground conformations independently of said thrasher 5, and for this purpose the rack-bar 19 is provided which cooperates with link 17 in controlling the movements of the parts associated therewith. Said rack-bar 19 may be actuated from a transverse shaft, 29, supported from the thrasher housing, and which shaft 29 is provided with a suitable pinion connection, 29', cooperating with the rack-bar 19 for actuating said bar, said shaft 29 being driven by suitable connection (not shown) with a motor, as 8', and as it is common practice to so actuate rack-bar controlling mechanism from a motor carried by the machinery, such means will not be further detailed herein.

The harvester 25, 30, for cutting and gathering the standing grain may be of any appropriate construction, and by its conveyer, 31, delivers the cut grain to the draper 6 or threshing and separating mechanism of the thrasher, and which conveyor, by any suitable arrangement, forms a flexible connection between the harvester and the forward portion of the thrasher, its delivery end, 32, being inclined, and hinged to section 31, as at 32'', so that it may yieldingly follow the movements of thrasher 5. Said harvester is supported by a frame which may include longitudinally disposed parallel beams, 33, 34, suitably spaced apart, and the diagonal brace-beam, 35, which connects said two beams in an appropriate manner. The beam 33 may extend to the rear of the machine and be provided with a counter-balancing weight, 36, for balancing the harvester 30 and for its convenient adjustment, but said weight may be otherwise connected or associated with said harvester, as will be readily understood. Said beams 33, 34 and 35 are secured to the supporting-axle, 38, by bolts or otherwise as indicated, thus providing a rigid connection between these members and the axle 38 to form the harvester frame. Such frame substantially as thus constructed is flexibly connected, at 39, with the front of the thrasher frame by a preferably inclined and diagonally disposed space-bar, 40, which is pivoted, at 41, to the frame-bar 34 by eye-bolts as indicated (or otherwise) passing through the axle 38 and beam 34. Through this connection the propelling power or pull of horse power or tractor, applied at the truck 8, is conveyed to the harvester frame by the space-bar 40 and the harvester is thus moved simultaneously and in substantial alignment with the thrasher section. By this arrangement it will be observed that the space-bar 40 forms a part of the harvester frame, and that in such manner I am enabled to employ a single direct connection between the harvester and thrasher bodies, which materially simplifies the effective assemblage thereof; and it will also be understood that said bar 40 serves as a controller for the grain conveyor section 32, as, being connected to the thrasher adjacent to said section, and limiting the lateral and vertical movement of the harvester and thrasher, it maintain the conveyer in proper position to follow movements of the thrasher. Also, being flexibly connected to axle 38 it controls the forward and backward movement thereof and at the same time permits its vertical adjustability under the varying ground conditions encountered during travel of the machine.

In order to completely provide flexible relation between harvester 30 and thrasher 5 I pivotally connect axle 38 to stub-axle 14 of the leveling-wheel 12, as by a socket, 38', in which said axle is inserted and which socket is secured by a bolt, 44, to stub-axle 14, or otherwise, so that as said harvester traverses the ground it is entirely free through the action of the pivotally mounted space-bar 40 and its pivotally mounted axle 38 to adjust itself to ground irregularities irrespective of the position of thrasher 5 and without in any wise interfering with or preventing the straight course or stability of said thrasher. As will be observed in Figs. 3, 4 and 5, ground differences at times during the travel of the machine may vary within a limited area so that the angular relation between the thrasher and harvester becomes quite pronounced, and I have found it both advisable and practical to arrest the downward tilting tendency of the thrasher and harvester, for which purpose I provide a stop for contacting axle 38 and thus arresting its movement, which stop I have shown as a curved arm, 47, secured to hub 12' and extending beneath said axle 38 to come in contact therewith, but do not desire to be understood as limiting myself to this particular construction for, as is obvious, any suitably arranged device for this purpose may be employed.

It will thus be seen that thrasher 5 is supported by the bull-wheel 11 and the adjustable or leveling-wheel 12, which latter in connection with the space-bar 40 and the other flexible connections described, maintains grain-wheel 13 and harvester 30 in operable position with said thrasher, the leveling-wheel 12 at the same time permitting said thrasher to be maintained in level position and thereby assuring efficient operation of said thrasher. The harvester 30, as explained, is flexibly supported by grain-wheel 13 and adjustable-wheel 12, and its cutting mechanism, as 25, is controlled by any suitable mechanism, and is assisted in its proper operable position by means of the counterbalancing weight, 36, adjustably secured on the beam 33, the axle 38 acting as a fulcrum for the counter-balancing weight when thus arranged. Being flexibly connected to the thrasher in substantially the manner described, the harvester is free to vary in its movements caused by irregularities of the ground over which the machinery is drawn, so that when conditions compel, the harvester readily adapts itself to move toward or away from the forward end of the thrasher, but at the same time the conveyer 31, 32, which carries the cut grain to the thrasher, is maintained in normal operative position, thus insuring a continuous and uniform delivery of material to the thrasher. It will also be understood that the thrasher, being constantly maintained in approximately level position, insures that the cut grain received from the harvester is distributed properly therein to be thoroughly threshed and separated by the devices in such thrasher. The machine as thus described is adapted to travel over and operate on unusually steep side hills, and should the thrasher section, which has a higher center of gravity than the harvester section, tend to tilt, as to the left in Fig. 5, it will be seen that this movement will be arrested by contact of a stop, as 47, with axle 38. This contact will shift the center of gravity of the tilting thrasher section toward the harvester section, and the tilting movements of the thrasher section will thus be arrested. Comparative illustrations of the positions which the combined machine may assume are indicated in Figs. 1, 3, 4 and 5, in the first three views of which it will be observed that the thrasher is maintained in level position and becomes so adjusted by the action of the rack-bar 19 and connected mechanisms associated with leveling-wheel 12, and the connection of the thrasher therewith through link 17, which assemblage of mechanisms permits a ready adjustment of the wheel 12 to varying ground conditions. As plainly indicated in Fig. 6, this arrangement becomes instantly adjusted to the tread of said wheel 12 so that when the wheel suddenly descends into a depression, as indicated by the dot-and-dash lines, the rack-bar 19, with link 17 and associated parts, readily follows such movement, while on the other hand, if ground conditions are of a character requiring a climbing movement of said wheel, said rack-bar and link will accordingly rise with said wheel, as indicated by dotted lines, the rack-bar, of course, controlling its connected mechanisms and being itself controlled by the pinion arrangement at 29'. When said wheel strikes level ground then these controlling mechanisms assume the position shown in full lines in said Fig. 6, and as also indicated in Fig. 1, so that it will be seen that any unusual movement of said wheel is simultaneously followed by the action of said rack-bar and associated parts. It will also be noted in Fig. 5 that when said wheel 12 momentarily misses the soil and there is a likelihood of the thrasher tipping, the stop 47 coming in contact with axle 38 arrests such tipping movement. However, such a situation while possible is not common, and under normal varying conditions the thrasher is maintained in level position, as indicated in Figs. 1, 3 and 4, which is accomplished through the action of the elbow structure hereinbefore referred to and which level position is obtained notwithstanding the irregular relative position of the harvester.

The action of the rack-bar 19 for vertically adjusting the intermediate wheel 12 and the adjustment of said wheel with the tilting of the harvester section to a side hill is illustrated in Figs. 3 and 6 wherein the thrasher section remains in level horizontal position. The wheel 12 is elevated by the action of the rack-bar as shown in Fig. 4 and the harvester section becomes positioned parallel with the surface of the side hill in order that the cutting mechanisms 25 may cut the standing grain. The conveyer 31 is also tilted through its connection with the harvester but is maintained through action of bar 40 in operative position to receive the straw and convey it to the draper in the thrasher. Said harvester 30 may also incline downwardly to conform to a downward slope of the hill side, as indicated in Fig. 4, at which time the wheel 12, as before explained, through its flexible connections 17, 19 will become adjusted to compensate for the decline or other irregularities.

From the above description taken in connection with my drawings it is evident that I have provided a combined harvester-thrasher including novel combinations and arrangements of parts whereby a wide range of flexibility in various directions is provided to insure at all times and under all conditions a comparatively perfect performance of the machine regardless of soil irregularities and the frequent varying conditions of either or both of its harvesting and threshing sections.

I claim as my invention:

1. The combination, in a harvester-thrasher, of threshing and separating mechanism, harvesting mechanism connected therewith for delivering grain thereto, means for supporting said threshing mechanism, a transverse axle for supporting said harvesting mechanism and having a grain-wheel thereon, an intermediate wheel between said threshing and harvesting mechanism, means for flexibly connecting said transverse axle of said wheel, flexible means for connecting said wheel to said thrasher, and flexible means connecting said thrasher and said harvester for maintaining said thrasher in operable position to permit independent variable movements between said thrasher and harvester.

2. The combination, with a harvester-thrasher comprising a harvester section and a thrasher section, of an axle for supporting said thrasher section, a leveling-wheel flexibly connected to said thrasher, an axle flexibly connected to said wheel and having a grain-wheel near its outer end, said harvester section being connected to said axle, and a space-bar flexibly connected to said axle and said thrasher section, said flexible connections between said thrasher and wheel and said axle permitting adjustability of said harvester section in relation to said thrasher section.

3. The combination, with a harvester-thrasher, of a thrasher section and a harvester section, a wheel connected to said thrasher, a grain-wheel connected to said harvester, an intermediate wheel between said thrasher and grain-wheels, means for flexibly connecting said grain-wheel to said intermediate wheel, and a space-bar pivotally connected to said thrasher and extending diagonally therefrom and pivotally connected to said means for flexibly connecting said grain-wheel.

4. In a combination harvester-thrasher, a supporting axle for said thrasher having a wheel mounted thereon, a leveling-wheel at the opposite side of said thrasher, a link connected to said axle and communicating with said leveling-wheel, and a grain-wheel flexibly connected to said leveling-wheel, whereby said wheels may automatically and independently adjust themselves to irregular ground conditions.

5. In a combination harvester-thrasher, a wheel connected to said thrasher, a grain-wheel connected to said harvester, a leveling-wheel intermediate said wheels, a link connecting said thrasher and leveling-wheels, and an axle supporting said grain-wheel and flexibly connected to said leveling-wheel.

6. In a combination harvester-thrasher, a main axle and wheel for supporting said thrasher, an axle forming part of the harvester frame and having a grain-wheel mounted thereon, an intermediate wheel between said wheels and mounted upon a stub-axle, said harvester axle being flexibly connected to said stub-axle, and flexible mechanisms secured to said stub-axle and said main wheel axle for permitting variable movements of said thrasher and harvester independently of each other.

7. In a combination harvester-thrasher, a main axle and wheel for supporting said thrasher, an axle forming part of the harvester frame and having a grain-wheel mounted thereon, an intermediate wheel mounted upon a stub-axle and flexibly connected with said two axles, and means associated with said stub-axle for arresting the tilting movement of said thrasher.

8. In a combination harvester-thrasher, a main axle connected to said thrasher, a wheel thereon, a harvester including an axle and grain-wheel thereon, a stub-axle flexibly connected with said two axles and having a wheel thereon, and a stop associated with said stub-axle and adapted to contact with a portion of said harvester to arrest tilting movement of the thrasher in relation to said harvester.

9. In combination, a harvester and a thrasher, diagonally arranged means flexibly connected to said harvester and thrasher, wheels for supporting said harvester and thrasher, an intermediate wheel, flexible means connecting said harvester thereto, and a link connecting said thrasher to said intermediate wheel, whereby said harvester and thrasher may be drawn in alinement and may tilt or otherwise vary in their relation to each other while traversing uneven soil.

10. The combination, in a harvester-thrasher, of a main axle and wheel supporting the thrasher section, a harvester connected to said thrasher and having an axle and grain-wheel thereon, a longitudinally disposed beam connected to said harvester and to said axle, a counter-balancing weight secured to said beam, a space-bar pivotally connecting said axle and thrasher, and an adjustable wheel flexibly connected between said two axles for leveling said thrasher and harvester sections in their movements over uneven soil.

11. In a harvester-thrasher, a main axle and wheel thereon for supporting said thrasher, a leveling-wheel flexibly connected to said axle for permitting its variable movements in relation to said thrasher wheel, a harvester adjacent said thrasher, an axle having a grain-wheel for supporting said harvester, means for flexibly connecting said axle to said leveling-wheel to permit independent movement of the latter, and a space-bar flexibly connected to said thrasher and to said harvester for permitting variable movement of said harvester in relation to said leveling-wheel and said thrasher.

12. The combination, with a harvester-thrasher, embodying axles of a leveling-wheel, means for flexibly connecting said wheel to said harvester axle, means for flexibly connecting said wheel to said thrasher axle, and flexible means for connecting said thrasher and harvester.

13. In a combination harvester-thrasher embodying axles, a supporting-wheel for said harvester axle, a supporting-wheel for said thrasher axle, a wheel positioned substantially intermediately between said wheels, means for flexibly securing said latter wheel to said harvester supporting-wheel axle, and means for flexibly securing said wheel to said thrasher supporting-wheel axle, whereby each of said wheels may become independently adjusted to ground irregularities over which it travels.

14. In a combination harvester-thrasher, a supporting-wheel for said harvester, a supporting-wheel for said thrasher, a wheel positioned intermediate of said wheels, means for flexibly securing said latter wheel to said harvester supporting-wheel, means for flexibly securing said wheel to said thrasher-supporting wheel, and means for arresting the tilting movement of said harvester and thrasher in relation to each other.

15. The combination, with a harvester-thrasher, of a leveling-wheel and an axle therefor, a sleeve on said axle, a bar connected to said axle, a socket member on said axle, an arm connected to said member, a link connecting said arm with the thrasher section of said harvester-thrasher, and a brace connecting said axle and bar whereby said parts are assembled and cooperatively actuated as a unit.

16. In a combination harvester-thrasher, a leveling-wheel having an axle, a sleeve therefor, a guiding-bar connecting said axle and thrasher, and means independent of said bar for connecting said sleeve and thrasher, whereby said leveling wheel may assume variable positions in relation to said thrasher.

17. In a machine comprising a combined harvester and thrasher, means flexibly mounted at the rear end of said harvester and at the forward end of said thrasher for maintaining the same in spaced relation, a leveling-wheel between said harvester and thrasher, means connecting said harvester to said wheel, and means fixedly connected to said leveling-wheel and flexibly connected to said thrasher for permitting adjustability of said wheel independently of said harvester and thrasher.

18. In a machine comprising a combined harvester and thrasher, flexible means connected to the rear end of said harvester and to the forward end of said thrasher for permitting variable movement between the same, a leveling-wheel between said harvester and thrasher, flexible means connecting said harvester to said leveling-wheel, flexible means connecting said thrasher to said leveling-wheel, and means associated with said leveling-wheel for controlling the movement of said thrasher in relation to said harvester.

19. In a machine comprising a harvester and thrasher, an axle supporting said thrasher, an axle supporting said harvester, a leveling-wheel between said harvester and thrasher, fixed means connected to said leveling-wheel and movable therewith, flexible means connecting said thrasher axle and said fixed means, and flexible means connecting said leveling-wheel and said harvester.

20. In a machine comprising a harvester and a thrasher, a flexibly mounted space-bar connecting said elements, a leveling-wheel between said harvester and thrasher, flexible means connecting said wheel and said thrasher, fixed means connected to said wheel and adapted to move therewith, and flexible means connecting said fixed means and said thrasher to permit said leveling-wheel to assume variable positions independently of and in relation to said harvester and thrasher.

21. In a machine comprising a harvester and thrasher, said thrasher having a fixed axle, an independently adjustable leveling-wheel adjacent said thrasher, a harvester adjacent said thrasher having an axle, flexible means connecting said harvester axle and said leveling-wheel, flexible means connecting said leveling-wheel and thrasher, and a diagonally arranged space-bar connecting said thrasher and harvester, whereby said thrasher, harvester and leveling-wheel may be self-adjustable to conform to ground irregularities over which the machine travels.

22. In a machine comprising a harvester and thrasher, a fixed wheel secured to one side of said thrasher, an adjustable leveling-wheel flexibly connected to the opposite side of said thrasher, a harvester at one side of said thrasher having a grain-wheel, an axle supporting said grain-wheel and flexibly connected to said leveling-wheel, and fixed means connected to said leveling-wheel for guiding the same in its variable movements in relation to said thrasher and harvester wheels.

23. In a machine comprising a harvester and thrasher, an adjustable leveling-wheel between the same, a bar fixedly secured to said leveling-wheel, a link connecting said wheel and thrasher to permit variable movement of said wheel in relation to said thrasher, means for controlling the variable movement of said bar, and means connected to said wheel and pivotally connected to said thrasher and co-acting with said bar for maintaining said wheel in substantially vertical position.

In testimony whereof I affix my signature.

ERNEST COBURN.